(12) United States Patent
Tokunaga

(10) Patent No.: US 8,184,396 B2
(45) Date of Patent: May 22, 2012

(54) DISK DRIVE DEVICE WITH HUB HAVING A ROTATIONAL FREQUENCY OF AXIAL RUN-OUT SMALLER THAN 0.1 μM FOR IMPROVED SHOCK RESISTANCE

(75) Inventor: Yusuke Tokunaga, Shizuoka (JP)

(73) Assignee: Alphana Technology Co., Ltd., Fujieda-Shi, Shizuoka (JP)

( * ) Notice: Subject to any disclaimer, the term of this patent is extended or adjusted under 35 U.S.C. 154(b) by 343 days.

(21) Appl. No.: 12/553,029

(22) Filed: Sep. 2, 2009

(65) Prior Publication Data

US 2011/0051287 A1 Mar. 3, 2011

(51) Int. Cl.
*G11B 5/012* (2006.01)
(52) U.S. Cl. ................ 360/97.01; 360/97.02; 360/99.12
(58) Field of Classification Search .... 360/97.01–97.04, 360/98.07, 98.08, 99.04, 99.05, 99.08–99.12
See application file for complete search history.

(56) References Cited

U.S. PATENT DOCUMENTS 6,310,747 B1* 10/2001 Emo et al. .................. 360/97.02
8,085,495 B2* 12/2011 Kumoi et al. .............. 360/99.08

FOREIGN PATENT DOCUMENTS

JP 2007198555 8/2007

* cited by examiner

*Primary Examiner* — Allen Heinz
(74) *Attorney, Agent, or Firm* — Fulwider Patton LLP

(57) ABSTRACT

The disk drive device includes a base plate, a hub on which a recording disk is mounted, a shaft bearing unit that is arranged on the base plate and that rotatably supports the hub, and a spindle drive unit that drives the hub to rotate. The spindle driving unit includes a stator core having a salient pole, a coil wound around the salient pole, and a magnet opposed to the salient pole. The hub formed of a magnetic material includes an outer cylindrical portion engaged with an inner circumference of the recording disk. A shaft is inserted into a sleeve, and the sleeve, which is of an approximate cylindrical shape, is inserted into a housing as part of the shaft bearing unit. The shaft is fixed to the rotational center of the hub, rotating along the axis together with the hub.

6 Claims, 7 Drawing Sheets

DISK DRIVE DEVICE WITH HUB HAVING A ROTATIONAL FREQUENCY OF AXIAL RUN-OUT SMALLER THAN 0.1 µM FOR IMPROVED SHOCK RESISTANCE

BACKGROUND OF THE INVENTION

1. Field of the Invention

The present invention relates to a disk drive device and particularly to the structure of a disk drive device.

2. Description of the Related Art

In recent years, there have been major improvements in the structural strength of disk drive devices. Particularly, the strength of the shaft bearing units of disk drive devices, such as hard disk drives (HDD), have greatly improved due to the utilization of fluid dynamic bearings (FDB). Moreover, as mobile devices are becoming more prevalent, the disk drives in mobile devices are being developed with essential properties, such as larger storage capacity, with increased thinness in the disk drive, and with improvements in impact resistance. These developments are essential in order to make the disk drive more portable and appropriate for mobile devices. Such improvements have been widely known, and have been already known to be applied to HDD. For example, see Japanese Patent Laid-Open No. 2007-198555, which discloses a disk drive device that enables an HDD containing a memory disk with a 63.5 mm outer diameter, the structure of the HDD having a thickness of 9 mm.

To satisfy this demand for creating a disk drive with high-capacity storage, it is required to have the recording disk to be installed on the mounting hub of the disk drive device so that it is stable when driven in a rotational manner. In order to do this, one needs to minimize the axial runout at the mounting point of the memory disk. If the axial runout of the mounting area where the recording disk meets the hub is excessive, this motion creates a large deviation along the axis of rotation of the recording disk, causing the magnetic head, which reads/writes magnetic data from/to the recording disk, to lose tracking ability (going "off track").

In the scenario where the axial runout is very large, the normal functions of reading and writing magnetic data are impaired. This challenge must be overcome when creating a disk drive with high-capacity storage.

Moreover, in order to meet the demand for the disk drive with increased overall thinness, the hub inside of the disk drive must also be made thinner. However, when the hub becomes thinner, the strength and stability of the hub is lowered. When manufacturing the hub, the lathing process (or chucking process) holds the hub in place in order to cut the form of the hub. In doing so, the place where the hub comes in contact with the lathing process is exposed to contact pressure. The lowering of the hub strength creates warping over the overall intended shape of the hub due to this contact pressure. The thinner the hub becomes, the more susceptible it is to warping, which, in turn, lowers the processing accuracy.

The thinning of the hub also leads to the weakening of the strength of the meeting point at which the disk drive's hub meets the shaft. In situations when an unequal weight distribution is applied to the hub, such as during motion shock, the force of impact is focused at the meeting point, making the shape of the hub change and creating a deviation in the axis of rotation that causes the axial runout to worsen. This additional challenge must be overcome when also creating a disk drive that has increased thinness.

SUMMARY OF THE INVENTION

In this background, a purpose of the present invention is to provide a technique for improving the axial runout of the recording disk mounted on the hub in the disk drive device and for improving the stability of when the magnetic head meets the recording disk while still providing a disk drive device that has high-capacity data storage and a thin profile.

To solve the above issues, an embodiment of the present invention is introduced that has a disk drive device comprising a hub on which at least one recording disk is mounted, a base rotatably supporting the hub through a bearing unit, a stator core fixed to the base, the stator core having a ring portion and a plurality of teeth, or salient poles, that extend radially from the ring portion, coils wound around the plurality of teeth, and a drive magnet fixed to the hub, the drive electromagnet being magnetized for driving and arranged to radially face the plurality of teeth, wherein the hub includes, around the circumference, an outside bank of which the center is a rotational axis, and a support surface of the outside bank on which the recording disk sits where, when the recording disk rotates, the fourth harmonic of the rotational frequency of the axial run-out on the support surface is smaller than 0.1 µm (micrometers).

Additionally, the embodiment describes a shaft, which is sleeved inside the bearing unit, fixed to the rotational center of the hub and rotating together with the hub, wherein the shaft has a reduced outer diameter where the hub meets the shaft, creating a groove around the perimeter of the shaft, and wherein the hub has a corresponding groove, at least when combined with the shaft, on the bottom portion of the hub that meets the shaft, the groove of the shaft locking into the corresponding groove of the hub.

Moreover, the embodiment describes the attachment system that includes a clamp that presses the recording disk onto the hub, the center of the clamp affixed to the central axis of the shaft by a fastener that is inserted into a hole located at the hub-end of the shaft, wherein the fastener makes contact with the shaft at a depth less than the thickness of the hub.

Optional combinations of the aforementioned constituting elements, and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 1 is an aerial view and a side view of the disk drive device, where

DETAILED DESCRIPTION OF THE INVENTION

The invention will now be described by reference to the preferred embodiments. This does not intend to limit the scope of the present invention, but to exemplify the invention. The size of the components in each figure may be changed in order to aid understanding. Some of the components in each figure may be omitted if they are not important for explanation. Hereinafter, in the document as a whole, the terms "above" and "upper" will refer to the direction of the disk drive device from the base plate to the hub.

Figure 1A:
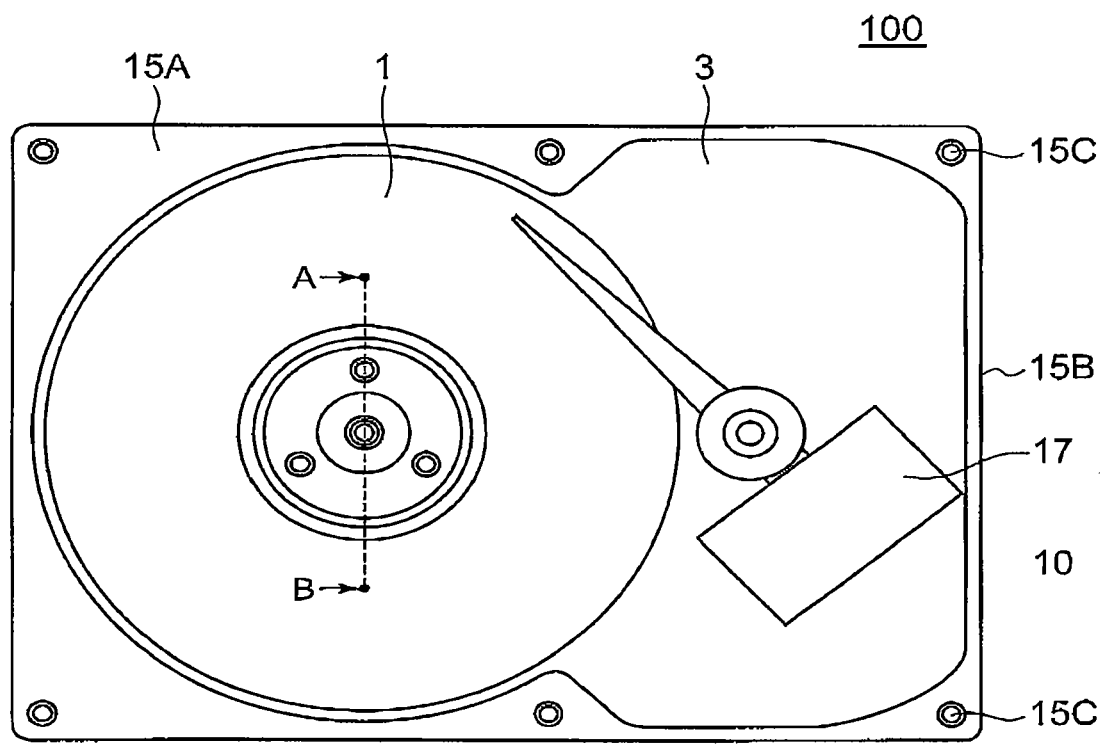
FIG. 1A is an aerial view and FIG. 1B is a side view.
Figure 1B:
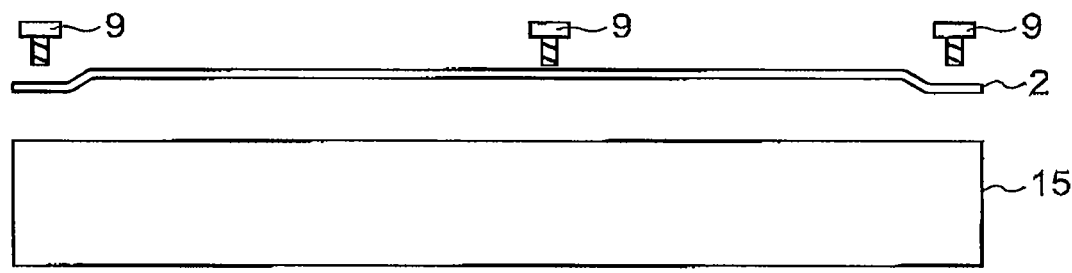
Figure 2:
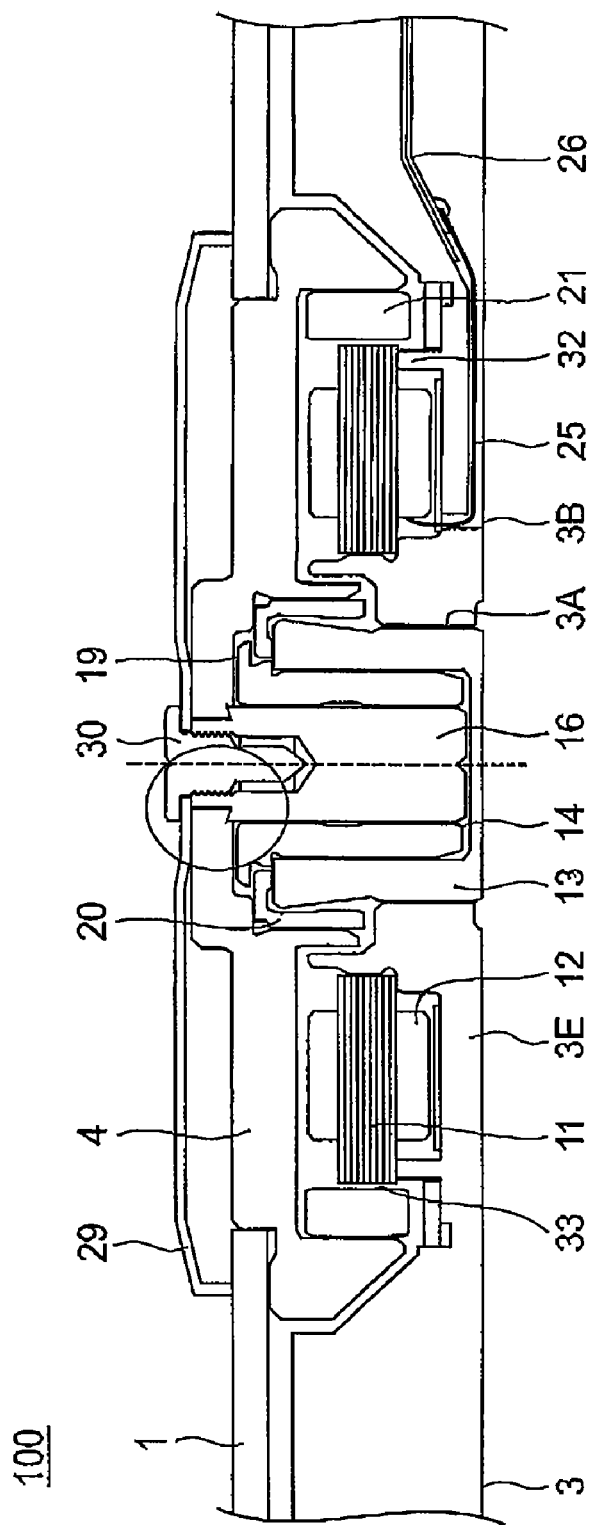
FIG. 2 is a partial cross-sectional view of the disk drive device as taken from point A to point B as indicated in FIG. 1, where

FIGS. 1A and 1B illustrate a disk drive device 100 according to an embodiment. FIG. 1A is an aerial view of the disk drive device 100, and FIG. 1B is a side view of the disk drive device 100. Here, FIG. 1A shows the state in which the top cover lid 2 is removed. Further, FIG. 2 is a partial cross-sectional view of the disk drive device 100 according to the present embodiment. FIG. 2 is the view that is sectioned from point A to point B, as illustrated in FIG. 1A.

The disk drive device 100 includes a chassis 10, which has a base plate 3 and a circumference wall 15. Part of the circumference wall 15 surrounds a recording disk 1, which is mounted on a hub 4, the hub attached to a shaft bearing unit 5, which is arranged on the base plate 3 so as to rotatably support the hub 4. The disk drive device 100 further includes a spindle driving unit 6 that drives the hub 4 to rotate, a head actuator unit 17, the top cover lid 2, and a set of lid attachment screws 9.

Further the disk drive device 100 includes a fixed body portion 7, configured with components that do not rotate, and a rotating body portion 8, configured with components that rotate. The fixed body portion 7 and the rotating body portion 8 respectively include the shaft bearing unit 5 that supports the hub 4 in order for the hub 4 to be relatively rotatable and the spindle driving unit 6 that drives the rotation of the hub 4.

The chassis 10 includes the base plate 3, which is the plane created by the chassis 10 being hollowed out, and the circumference wall 15, which forms a wall shape around the outer circumference of the base plate 3. The base plate 3 has a bearing hole 3A into which a housing 13, a sleeve 14, and a shaft 16 are inserted. The outer circumference surface of the circumference wall 15 forms a rectangular shape. The inner circumference surface of the circumference wall 15 is formed by connecting a circle-shaped portion 15A, shaped for accommodating the recording disk 1, with a rectangular portion 15B, shaped for accommodating the area to which the head actuator unit 17 is mounted.

The top cover lid 2, which is illustrated in FIG. 1B, is arranged and fixed at the upper-end of the circumference wall 15 by screwing the lid attachment screws 9 into a set of screw holes 15C, which are formed along the upper-end of the circumference wall 15. A clean air chamber is formed by enclosing the chassis 10 with the top cover lid 2, the chamber created in the space among the hollow portions of the chassis 10. The clean air chamber is filled with clean air from which particles are removed. The recording disk 1, which is a magnetic recording medium, the rotating body portion 8, and the head actuator unit 17 are all arranged within the clean air room.

Figure 2A:
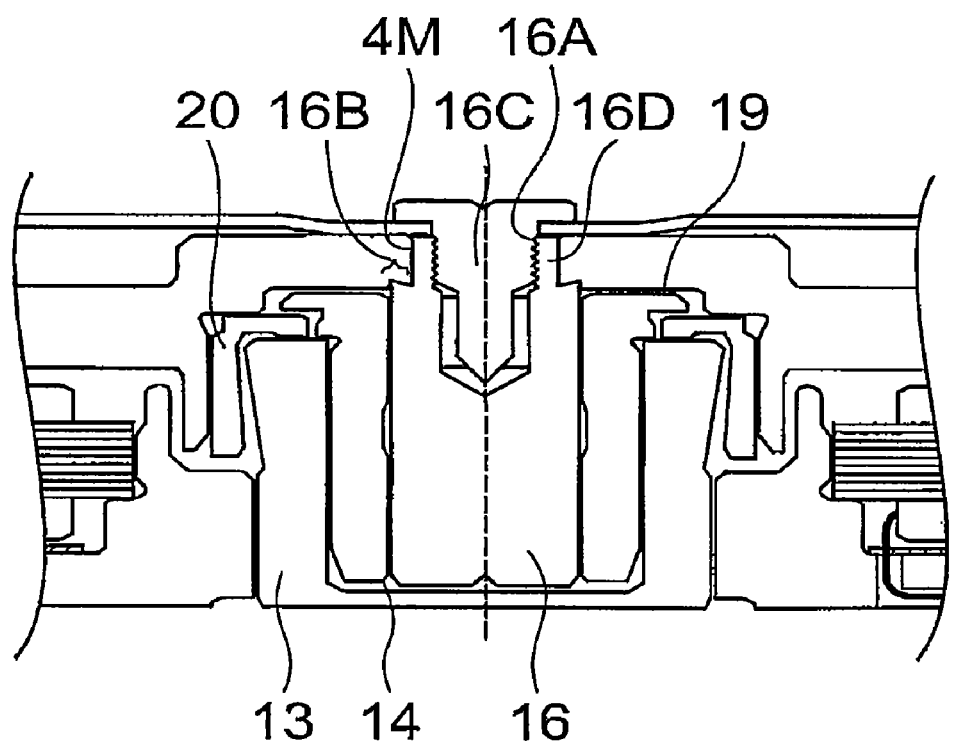
FIG. 2A is a partial enlarged view of the shaft bearing unit.

FIG. 2A is a partial enlarged view of the shaft bearing unit 5 in FIG. 2. The shaft bearing unit 5 is arranged on the base plate 3 and may include the shaft 16, the sleeve 14, the housing 13, and a flange 20. Further, the shaft bearing unit 5 includes a radial dynamic pressure trench 22 and a thrust dynamic pressure trench 23.

The shaft 16 functions as the rotational axis of the disk drive device 100. The upper end of the shaft 16 is affixed to a hole 4M formed at the center of the hub 4. The shaft 16 is inserted into the sleeve 14, and the sleeve 14, which is of an approximate cylindrical shape, is inserted into the housing 13. A part of the outer circumferential surface of the sleeve 14 is affixed to the inner circumferential surface of the housing 13 by bonding or the like. A sleeve fringe 19 is part of the upper end of the sleeve 14 along an open-ended surface 14A and extends radially outward. The sleeve fringe 19, in cooperation with the flange 20, restricts the movement of the hub 4 along the direction of the rotational axis. Further, the sleeve fringe 19 and the flange 20 both help prevent the rotating body portion 8 from coming ajar and being displaced.

The housing 13 is a cuplike structure with a bottom floor. A part of the outer circumferential surface of the housing 13 is affixed to the bearing hole 3A. The bottom floor of the housing 13 is formed at the lower end of the housing 13 for the purpose of sealing lubricant so that it does not leak outside.

The radial dynamic pressure trench 22 and the thrust dynamic pressure trench 23 function to aid the shaft bearing unit 5 in rotatably supporting the hub 4.

Two radial dynamic pressure trenches 22, which are made up of a herringbone-shaped pattern, are formed apart from each other along either the inner circumferential surface of the sleeve 14 or the outer circumferential surface of the shaft 16. Further, the thrust dynamic pressure trenches 23, which are made up of a herringbone-shaped or spiral-shaped pattern, are formed on both the surface of the flange 20 that opposes the open-ended surface of the housing 13 and the upper surface of the flange 20 that opposes the lower surface of the sleeve fringe 19. Here, the thrust dynamic pressure trenches 23 may be formed at least on either the open-ended surface 14A of the sleeve 14 or at a lower end surface 4F of the hub 4, which opposes the open-ended surface 14A.

When the shaft 16 is rotated, radial dynamic pressure is generated by the lubricant along the radial dynamic pressure trench 22 so that the rotating body portion 8 is supported in the radial direction. Further, when the flange 20 is rotated, thrust dynamic pressure is generated by the lubricant along the thrust dynamic pressure trench 23, so that the rotating body portion 8 is supported in the thrust direction.

A capillary seal 24 is formed with the use of the inner circumferential surface of the cylindrical portion the flange 20 and the outer circumferential surface of the housing 13 so that the gap between the inner circumferential surface of the flange 20 and the outer circumferential surface of the housing 13 gradually becomes larger toward the opening end along the lower side of the flange 20. A lubricant, such as oil, is infused into the space defined by the radial dynamic pressure trench 22 and the opposing surface thereto, the thrust dynamic pressure trench 23 and the opposing surface thereto, and the capillary seal 24. The boundary level at which the lubricant contacts the outside air (i.e., the liquid level) is set to be at some mid-way part of the capillary seal 24. The capillary seal 24 prevents the leakage of the lubricant with the capillary effect.

The spindle driving unit 6 includes a stator core 11, which is affixed to the base plate 3, a three-phase coil 12, which is wound around a salient pole of the stator core 11, and an approximately cylindrical drive magnet 21, which is fixed along an inner cylindrical portion 4D of the hub 4. A stator core supporting member 32 is disposed between the salient pole of the stator core 11 and the base plate 3. The stator core supporting member 32 is arranged to circularly project from the base plate 3 toward the salient pole of the stator core 11 while leaving clearance for coil 12.

The stator core 11 includes a circular ring portion and nine teeth, or salient poles, which are extended radially therefrom. The stator core 11 is formed by applying insulation coating, such as electro-deposition coating or powder coating, on the surface of a plurality of magnetic plates, such as ferrosilicon plates, that have been laminated. The magnet 21 is formed of a rare-earth material such as, for example, Nd—Fe—B (neodymium-iron-boron). Rust-proofing, such as applying an electro-deposition coating or a splay coating, is performed on the surface of the magnet 21. Further, the magnet 21 consists of driving magnetic poles, twelve poles for example, along the inner circumference of the magnet 21. The magnet 21 opposes the distal ends of the salient poles.

As the coil 12, a wire 25 is wound a predetermined number of times around the salient pole of the stator core 11 and is then wound around another salient pole of the stator core 11. After the wire 25 is continuously wound a predetermined number of times around the salient poles of the stator core 11 in this manner, the wound end of the wire 25 is drawn to the salient pole of the stator core 11. Subsequently, the wound end of the wire 25 is drawn to the opposite side of the base plate 3 through a wire hole 3B, which is disposed at the base plate 3 and then is electrically connected to a flexible wiring substrate 26 that is arranged at the lower surface of the base plate 3. The wound end of the drawn wire 25 is fixed with a bonding agent so as not to be released. Such fixture prevents the wire 25 from becoming disconnected due to the large-amplitude vibration caused by resonance during an ultrasonic cleaning process.

When the coil 12 is powered with the three-phase current of approximate sine-waves by a predetermined drive circuit via the flexible wiring substrate 26, the coils 12 generate a magnetic field for rotation at the salient poles of the stator core 11. A rotation driving force is generated by the interaction between the driving poles of the magnet 21 and the magnetic field for rotation so that the rotating body portion 8 is rotated. Namely, the spindle driving unit 6 drives the rotating body portion 8 to rotate.

The fixed body portion 7 is configured to include the chassis 10, the stator core 11, the coil 12, the housing 13, and the sleeve 14. Further, the rotating body portion 8 is configured to include the approximately pan-shaped hub 4 to which the recording disk 1 is mounted, the shaft 16 that the hub 4 is affixed to, and the magnet 21.

In general, the rotating body portion 8 has a particular issue concerned with the amount of force that it is able to withstand. One of the issues that the inventors sought to overcome with this embodiment was that, in the case where some impact is applied to the disk drive device, the hub would receive the majority of the impact due to an unequal weight distribution being applied to the hub. In such a case, the applied force of the impact concentrates at the junction between the hole and the shaft. This issue is realized when the hub needs to be made thinner in order to accommodate a thin disk drive used for a mobile device. If the hub is made thinner, the surface area of the junction on which the hole and the shaft meet will consequently be made smaller. If the surface area of the junction of the hub and the shaft is made smaller, it becomes easier for the hub to tilt according to a plastic deformation of the hole if some uneven impact is applied to the hub. If the hub tilts, the axial runout of the hub becomes measurable, and the frequency of the magnetic head going off track becomes larger.

Figure 3:
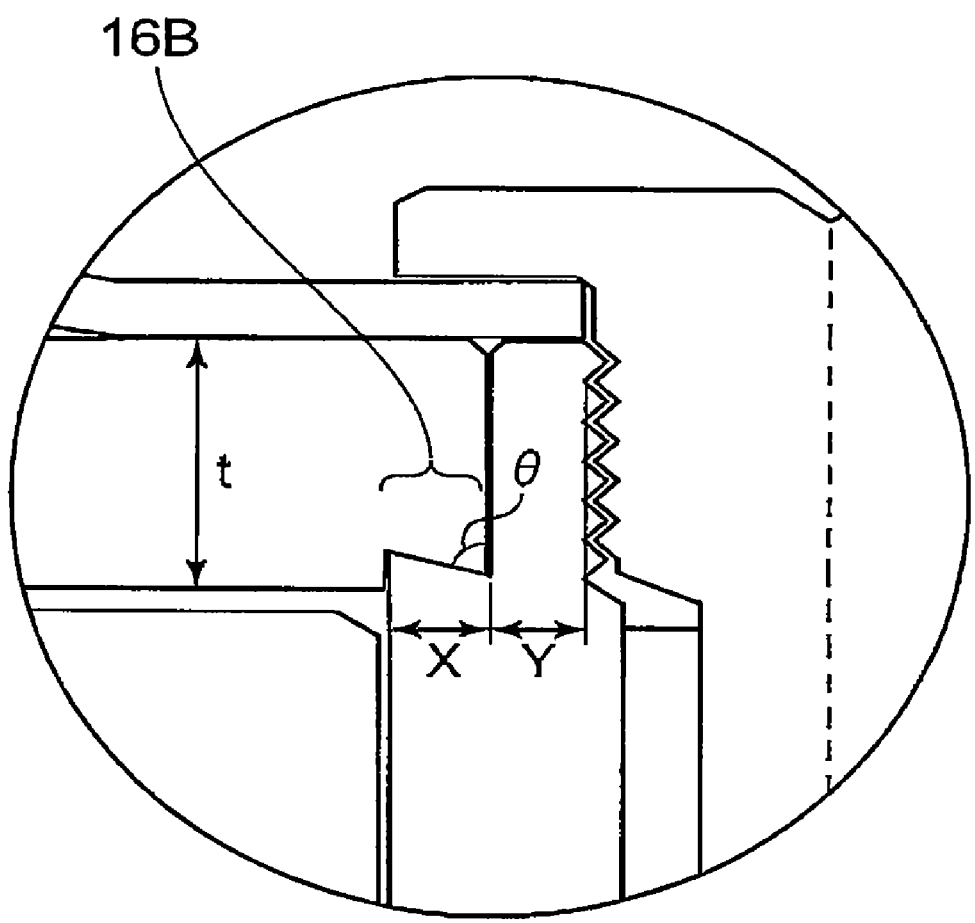
FIG. 3 is a partial enlarged view of FIG. 2 that shows the attachment of the recording disk onto the shaft.

The response to the issue to overcome as raised above is shown in both FIG. 2 and FIG. 3. FIG. 3 shows a partial enlarged view of FIG. 2 with magnified emphasis on the junction where the hub 4 meets the shaft 16. The shaft 16, which is sleeved inside the shaft bearing unit 5, is fixed to the rotational center of the hub 4, rotating along the axis together with the hub 4. By reducing the outer diameter of the outermost region of an upper part 16D of the shaft 16, where the lower end surface 4F of the hub 4 is presumably attached to the shaft 16, one creates a groove 16B around the perimeter of the shaft 16 that will securely penetrate the hub 4. That is, when the hub 4 is being mounted on the shaft 16 (when shaft 16 is fixed to the hole 4M), one applies pressure on the lower end surface 4F of the hub 4 along the outer perimeter of the upper part 16D so that the shape of the lower end surface 4F becomes deformed. The deformed shape of the lower end surface 4F creates a corresponding groove, at least when combined with the shaft 16, on the bottom portion of the hub 4 that meets the shaft 16, the groove 16B of the shaft 16 locking into the corresponding groove of the hub 4.

As a result of the creation of a groove 16B, the surface area on which the hub 4 and the shaft 16 come in contact with one another becomes larger making the rotation of the hub 4 more secure. The tilt of the hub due to uneven impact becomes smaller, decreasing the axial runout of the hub 4.

It is difficult to realize the creation of a corresponding groove in the hub 4 without considering the relative hardness of the hub 4 material and the shaft 16 material. When the hub 4 is made of a material equal to or harder than the material of the shaft 16, it becomes more difficult for the upper part 16D of the shaft 16 to bite into the hub 4. Therefore, the hardness of the hub 4 should be smaller than that of the upper part 16D.

However, if the hardness of the upper part 16D is too great, the degree of fragility must be accounted for. In such a case when the shaft 16 is made of an extremely hard material, the shaft 16 may be broken when it is pressed into the hole 4M. On the other hand, besides what the above paragraph states, if the hardness of the upper part 16D is rather small, the shaft 16 may be bent while pressing it into the hole 4M.

Therefore, it is preferred that the hardness of the upper part 16D be set to be 450 Hv-550 Hv. In a similar manner as above, it is preferred that the hardness of the lower end surface 4F of the hub 4 be set to be 200 Hv-400 Hv.

Furthermore, if the groove 16B of the shaft 16 is a right angle or an obtuse angle, that is, if the angle θ of the groove 16B of the upper part 16D is 90 degrees or higher, it becomes necessary to apply a large amount of pressure to the shaft 16 in order to properly bite into the hub 4 and create a corresponding groove. This is not desirable since the large pressure exerted in the biting process may deform the hub 4. It is preferred that the angle θ of the groove 16B of the shaft 16 of the upper part 16D make an acute angle, that is, an angle less than 90 degrees.

If the contact area where the lower end surface 4F of the hub 4 meets the upper part 16D of the shaft 16 is rather small, as stated above, the hub 4 is more likely to tilt in response to impact.

According to FIG. 3, the variable X represents the value of the distance that the upper outside perimeter is decreased in order to create the groove 16B in the shaft 16. In other words, X is the distance that the hub 4 protrudes into the shaft 16, touching the upper part 16D. A hollow shaft ring is created by a shaft hole 16C being located at a first end surface 16A of the shaft 16.

The variable Y represents the thickness of the shaft ring at the upper part 16D portion of the shaft 16 with the reduced outer diameter. To increase stability in the hub 4, it is preferable that the value of X be greater than the value of Y, that is, the distance at which the hub 4 protrudes into the shaft should be greater than the thickness of the shaft ring at the reduced outer diameter. By adhering to this rule, the contacting surface area increases, and the issue of tilt is lessened.

Figure 4:
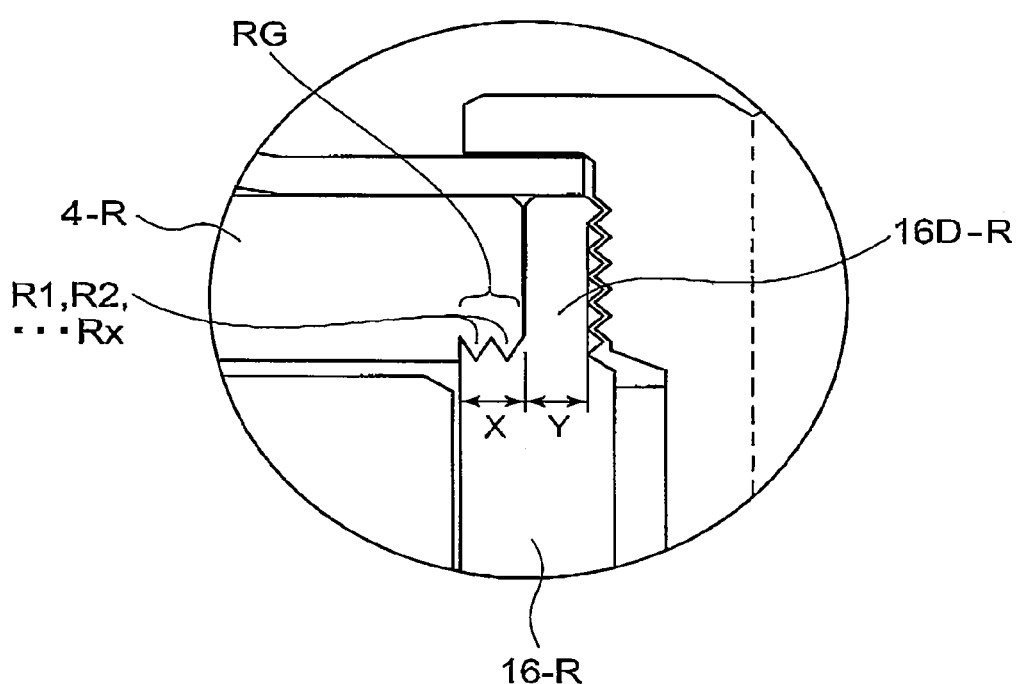
FIG. 4 is a partial enlarged view of FIG. 2 that shows the attachment of the recording disk onto the shaft.

Another embodiment is shown in FIG. 4, which is a partial enlarged view of FIG. 2 with magnified emphasis on the junction where the hub 4-R meets the shaft 16-R, wherein the groove RG of the shaft 16-R at the upper part 16D-R has one or more recesses, R1, R2, . . . Rx. As similarly described above, the shaft 16-R bites into the hub 4-R, the groove RG of the shaft creating and locking into the corresponding groove of the hub 4-R. By adding one or more recesses R1-Rx to the groove RG of the shaft 16-R, the hub 4-R similarly has corresponding recesses created in the hub 4-R that lock together with the recesses R1-Rx of the shaft 16-R. As a result, the surface area where the hub 4-R and the shaft 16-R come in contact is further increased, thus increasing the stability of the rotation of the hub 4-R.

Additionally, the embodiment describes an attachment system for attaching the recording disk 1 to the rotating body portion 8 of the disk drive device 100 wherein a fastener does not go beyond a certain depth in order to maintain proper pressure, lowering the deviation of the axial rotation.

In FIG. 2, the recording disk 1 is securely mounted on the hub 4 by a clamp 29 that presses the recording disk 1 onto the hub 4, the center of the clamp 29 having a hole that is aligned to the central axis of the shaft 16 and affixed to the shaft 16 by a fastener 30, such as a screw, that is inserted into the shaft hole 16C located on the first end surface 16A of the shaft 16. The center of the shaft hole 16C substantially coincides with the rotational center of the shaft 16.

In the disk drive device of prior art, a screw is screwed all the way down, reaching beyond the depth of the thickness of the hub. The outer surface of the shaft slightly deforms (swells) in the place that comes in contact with the screw. If this slight deformation reaches the surface corresponding to the radial dynamic pressure trench, the dynamic pressure may become unstable, thus affecting the axial runout.

According to FIGS. 2, 3, and 4, in response to this issue, the fastener 30 is inserted into the shaft hole 16C and makes contact with the shaft hole 16C of the shaft 16 at a depth less than the thickness of the hub 4, represented by the variable t as shown in FIG. 3. At the point below the upper part 16D of shaft 16, the fastener 30 does not touch the shaft 16. This will ease the issue described above by eliminating the deformations caused in the prior art. In another embodiment, the fastener does not go any farther than the point below the upper part of shaft. For example, in both embodiments, a fastener 30 that is a screw of M1.6, fine-pitch, the pitch of threads being 0.2 mm, may be adopted. If the dimension of the hub 4 in the axial direction is 1.4 mm, the number of threads would be from four to seven.

Figure 5:
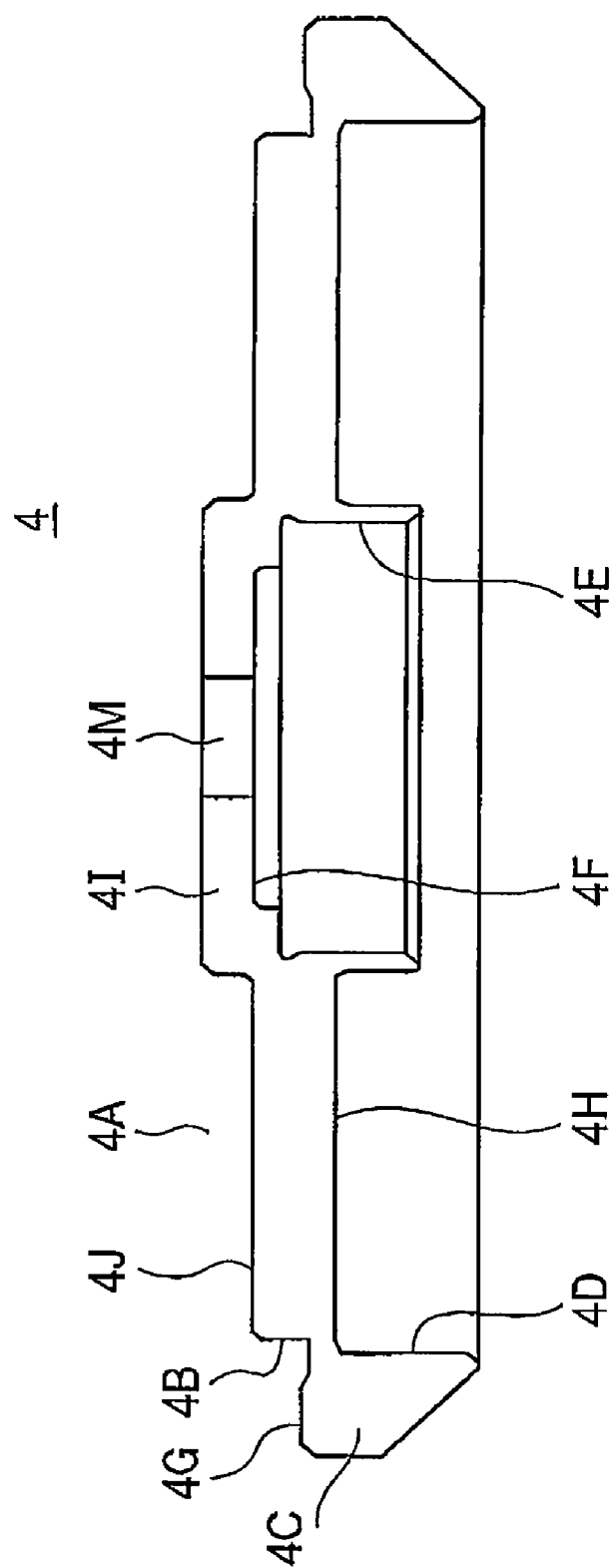
FIG. 5 is a partial cross-sectional view of the hub.

In the following, the hub 4 is specifically described with reference to FIG. 5. The hub 4 is formed of a magnetic material, such as SUS430F as coded by the Japanese Stainless Steel Association (US equivalent, AISI430F), which is a soft magnetic material. It is desirable to form the whole hub 4 with a magnetic material in view of generating the effect of a magnetic shield. For example, the stainless steel, product name DHS1, manufactured by Daido Steel Co., Ltd., is preferable in view of ease of lathing. In addition, stainless steel, product name DHS2, is further preferable in view of excellent corrosion resistance.

The hole 4M is formed at the center of the hub 4, and a circular center portion 4I is formed around the hole 4M. The hole 4M is formed so that the dimension thereof along the direction of the rotational axis is shorter than the dimension along the rotational axis direction of the part of the circular center portion 4I opposing the upper-end surface of the sleeve 14. A part of the outer circumference of the hole 4M is projected downward.

A two-step portion is formed as a ring around the upper end surface 4A of the hub 4, and the circular center portion 4I is located at the top level of the two-step portion. A lowered portion 4J, which is the second lowered step from the circular center portion 4I, is formed at the upper end surface 4A in a ring-shape. The clamp 29 is deployed on the lowered portion 4J, and the clamp 29 is fixed by inserting the fastener 30 into the hole 4M.

An outer cylindrical portion 4B is formed as a stepped portion that is lowered from the periphery of the lowered portion 4J. As an outside bank of the hub 4, a circular extending portion 4C is formed to extend outward in the diameter direction from the lower end of the periphery of the outer cylindrical portion 4B. The inner circumference of the center hole of the recording disk 1 is engaged with the outer cylindrical portion 4B of the hub 4 so that the recording disk 1 is mounted on an upper support surface 4G of the circular extending portion 4C. The circular extending portion 4C settles into the base plate 3 without contact. The outer circumference of the magnet 21 is affixed to the inner cylindrical portion 4D. The circular extending portion 4C, which is located in an area outside the outer circumference of the magnet 21 along the diameter of the hub 4, functions as the back side of the magnet 21.

A hanging ring portion 4E, which projects in the direction toward the base plate 3 between the housing 13 and the stator core 11, is formed at the lower surface of the hub 4. The midpoint or center of the hanging ring portion 4E corresponds to the rotational center of the hub 4. The circular flange 20 is fixed to the inner circumference surface of the hanging ring portion 4E of the hub 4 with a bonding agent.

The lower end surface 4F of the hub 4 opposing the open-ended surface 14A of the sleeve 14 is located at the back surface of the circular center portion 4I. A flat inner portion 4H of the hub 4 opposing to the coil 12 is located at the back surface of the lowered portion 4J.

Figure 6:
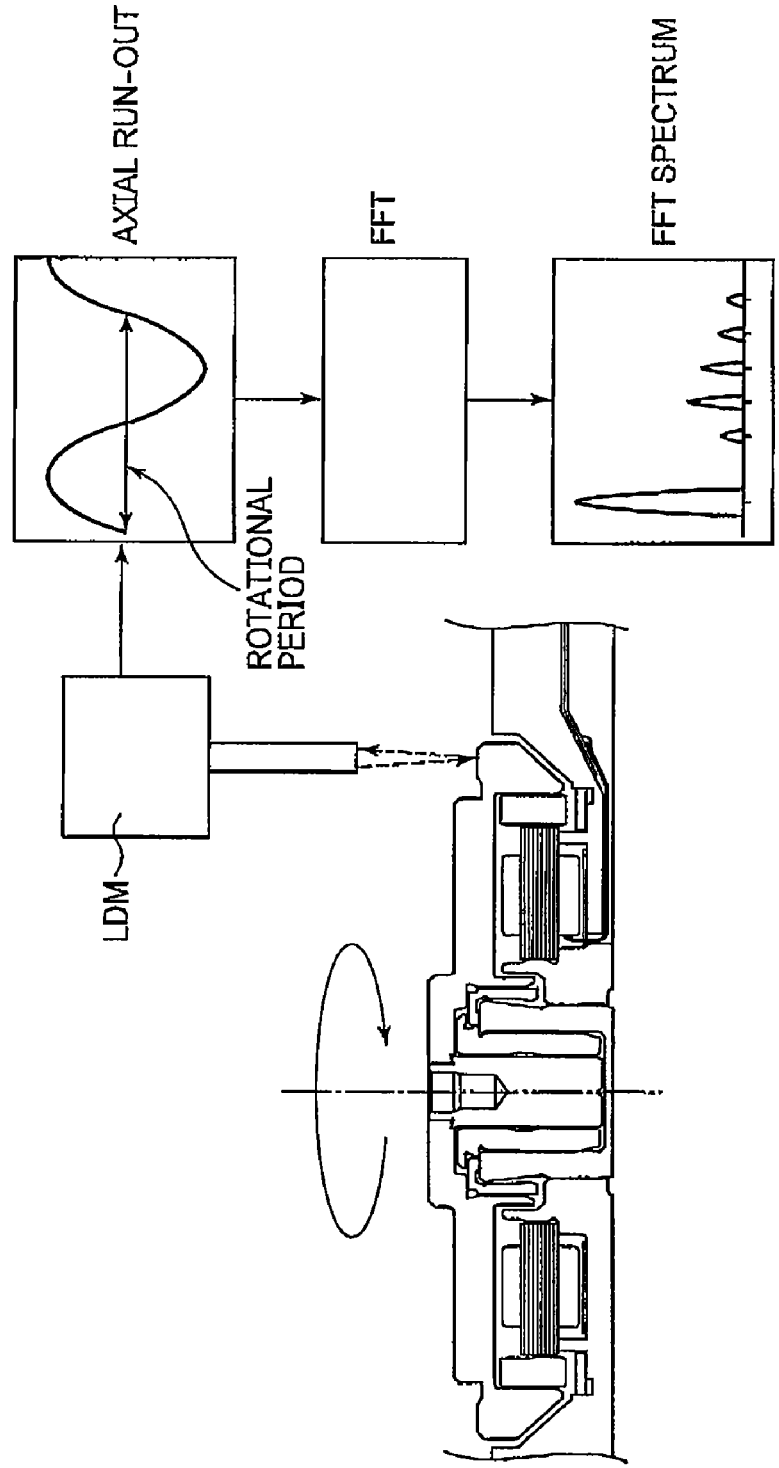
FIG. 6 is a partial cross-sectional view of the disk drive device illustrating the rotation of the hub.

According to the experiments that were performed by the inventors, it was necessary to suppress the axial runout of circular extending portion 4C to be at a value below 20 micrometers in order to prevent the magnetic head from going off track with respect to the recording disk 1. Here, the axial runout of the circular extending portion 4C refers to the change in height along the axial direction of the support surface 4G of the circular extending portion 4C when the hub 4 is mounted onto the disk drive device 100 and rotates. For example, as shown in FIG. 6, the displacement occurring along the axial direction is measured by illuminating the support surface 4G of the circular extending portion 4C with a laser beam from a laser displacement meter LDM while the hub 4 rotates. The output from the laser displacement meter LDM changes according to the change in the height in synchronization with the rotation of the hub 4. This output could undergo Fourier-transform analysis by FFT, and one can obtain the first component, equivalent to the base rotational frequency, and multiples of the base rotational frequency, otherwise known as harmonics or high-frequency components, such as the second, third, fourth, fifth, sixth, and seventh harmonic, etc. In other words, it is possible to say that the axial runout of the circular extending portion 4C includes such high-frequency components.

In order to suppress the first component of the axial runout of the circular extending portion 4C to below 20 micrometers, the hub 4 is treated by an initial cutting process. In the initial cutting process, the raw material is cut in the following order; the hole 4M, the lower end surface 4F, the hanging ring portion 4E, the flat inner portion 4H, and the inner cylindrical portion 4D. These parts of the hub are referred to as the inner form. Then, in the same manner, a second round of cutting is performed where the hub 4 is cut in the following order; the upper end surface 4A, the outer cylindrical portion 4B, and the circular extending portion 4C. These parts of the hub are referred to as the outer form. However, in the above process, the axial runout of the circular extending portion 4C is between 50 micrometers and 200 micrometers, which does not satisfy the required condition.

Therefore, in another embodiment, in a second cutting process, the inner cylindrical portion is chucked by the chuck of a lathe, and then the circular extending portion is again treated. This will reduce the axial runout of the first component of the circular extending portion to be below 20 micrometers.

However, even after the axial runout of the first component of the circular extending portion is reduced in the above way, the magnetic head may still go off track with respect to the recording disk. According to the research by the inventors, in some cases, the magnetic head going off track sometimes happens because the fourth harmonic or greater of the high-frequency components of the axial runout of the circular extending portion is rather large. According to further investigation, even after the chucking process above is performed, the circular extending portion will still have an axial runout corresponding to the outline of the chuck. For example, the chuck of the lathe generally has between three to seven teeth. When the teeth retract, the inner cylindrical portion of the hub is free to be set/unset in the lathe. The inner cylindrical portion is set to the chuck when the teeth are retracted, and then the inner cylindrical portion is held by the teeth by expanding them, whereby the hub is set to the chuck. In this situation, pressure is applied to the inner cylindrical portion in a substantially polygonal (three to seven-point) arrangement in the direction in which the teeth have expanded. Due to this pressure, the circular extending portion becomes deformed so that the hub 4 is warped in correspondence with the outline of the teeth.

In the process above, when the teeth of the lathe are expanded and come in contact with the circular extending portion 4C, the pressure of the teeth cause the circular extending portion 4C to become misaligned, leading to the deformation of the circular extending portion by the hub being shaped in the lathe while accommodating the pressure. However, after the process, the teeth of the lathe are retracted and the hub 4 is unloaded from the lathe. Then, the pressure exerted by the teeth no longer exists, and the deformation caused by the pressure is restored in the hub 4. As a result, the circular extending portion 4C will have the third through the seventh harmonic of the high-frequency components of the axial runout due to deformation caused by the outline of the lathe.

If the first component of Fourier components of the axial runout of the circular extending portion 4C that is synchronous with the rotational frequency is less than 20 micrometers, the possibility that the magnetic head goes off track is less likely to happen since the magnetic head reads/write from/to a recording disk 1 with a predetermined tracking control. However, if the harmonics higher than the fourth harmonic of the high-frequency components of the axial runout of the circular extending portion 4C are large, this tracking control of the magnetic head will not efficiently suppress itself from going off track.

According to further investigation by the inventors, if the fourth harmonic of the high-frequency components of the axial runout of the circular extending portion 4C is made less than 0.1 micrometer, the magnetic head will be prevented from going off track with respect to the recording disk 1 at a number below a required level. This will not be realized by the process above, namely chucking the inner cylindrical portion 4D, but will be realized by the process below.

In part of the embodiment of the present invention, the circular extending portion 4C is processed again by chucking the hanging ring portion 4E to the chuck of the lathe. This does not create any deformation of the circular extending portion 4C due to the pressure applied by the chuck.

Also, this reduces the fourth harmonic of the high-frequency components of the axial runout of the circular extending portion 4C to be less than 0.1 micrometer. As a result, the situation where the recording disk has difficulty to be tracked by the tracking control of the magnetic head could be easily prevented. Alternatively, the fifth, sixth, or seventh harmonic of the high-frequency components of the axial runout of the circular extending portion 4C could be made less than 0.1 micrometers. This will strengthen the prevention of such situations where the magnetic head goes off track.

In another embodiment of the present invention, it is preferred that the second harmonic be less than or equal to 1.5 micrometers and/or the third harmonic be less than or equal to 0.2 micrometers.

Furthermore, when the frequency of the rocking-mode resonance becomes low, there may be a case where a large vibration occurs due to the resonance created with the variation of the drive torque. There may be an issue that such vibration causes an impairment of the normal read/write operations of magnetic data because the vibration can cause tilt in the hub. In order to cope with this issue, the width in the axis direction of the flat inner portion 4H of the hub 4 opposed to the coil 12 may be made larger than the width in the axis direction of a trench 3E of the base plate 3 opposed to the coil 12.

This is for relative purposes when the disk drive device 100 is thinned that the dimensions of the base plate 3 and the hub 4 in the axis direction correspond to above. As a result of making the flat inner portion 4H larger than the trench 3E of the base plate 3, this relieves the effect that the frequency of the rocking-mode resonance can cause on the disk drive device 100.

As described above, the disk drive device 100 according to the present embodiment easily allows for the combination of high-capacity storage and thinness of the device while preventing the effects of motion-shock by stabilizing the rotation of the recording disk 1.

Not limited to the abovementioned embodiments, it is possible to modify the present invention by various design changes based on the knowledge of skilled persons. The configuration illustrated in each of the drawings is simply for purposes of describing an example and can be appropriately modified so that the similar effects are obtained as long as the similar functions can be achieved.

Some examples of modifications include a disk drive device that is not of a rectangular shape, a coil that is not a three-phase coil, the number of teeth, or salient poles, being variable, etc. Additionally, the embodiments above include both situations when the drive motor is attached to the base plate and when the drive motor is not attached.

What is claimed is:

1. A disk drive device comprising:
   a hub on which at least one recording disk is to be mounted;
   a base rotatably supporting the hub through a bearing unit;
   a stator core fixed to the base, the stator core having a ring portion and a plurality of teeth that extend radially from the ring portion;
   coils wound around the plurality of teeth; and
   a drive magnet fixed to the hub, the drive magnet being magnetized for driving and arranged to radially face the plurality of teeth,
   wherein the hub includes, around the circumference, an outside bank of which the center is a rotational axis, and a support surface of the outside bank on which the recording disk is to sit where, when the hub rotates, the fourth harmonic of the rotational frequency of the axial run-out on the support surface is smaller than 0.1 μm.

2. A disk drive device according to claim 1, wherein the thickness of the hub at the portion opposing the coil is greater than the thickness of a baseplate on which the hub is mounted at the portion at which the coil is opposing.

3. A disk drive device according to claim 1, wherein the fifth harmonic of the rotational frequency of the axial run-out on the support surface is smaller than 0.1 µm.

4. A disk drive device according to claim 1, wherein the sixth harmonic of the rotational frequency of the axial run-out on the support surface is smaller than 0.1 µm.

5. A disk drive device according to claim 1, wherein the seventh harmonic of the rotational frequency of the axial run-out on the support surface is smaller than 0.1 µm.

6. A disk drive device according to claim 1, wherein the shape of the hub is created by a lathing process in which a hanging ring portion of the hub with a midpoint at the center of the hub is used as the lathe attachment so as not to create warping.

* * * * *